United States Patent [19]

Langer et al.

[11] 4,359,715

[45] Nov. 16, 1982

[54] CODED FAILURE INDICATOR FOR AN AIR BAG SYSTEM

[75] Inventors: Peter Langer, Troy; Carlos Dominguez, Detroit, both of Mich.

[73] Assignee: Ford Motor Company, Dearborn, Mich.

[21] Appl. No.: 219,174

[22] Filed: Dec. 22, 1980

[51] Int. Cl.³ .............................................. B60R 21/00
[52] U.S. Cl. ................................ 340/52 R; 340/52 H; 340/61; 180/271; 307/10 R
[58] Field of Search ................. 340/52 R, 52 E, 52 F, 340/52 H, 53, 61, 517, 519; 180/271, 274; 307/10 R

[56] References Cited

U.S. PATENT DOCUMENTS

| | | | |
|---|---|---|---|
| 3,601,655 | 8/1971 | Anderson | 307/10 R |
| 3,622,974 | 11/1971 | Best | 340/53 |
| 3,629,816 | 12/1971 | Gillund | 340/61 |
| 3,633,159 | 1/1972 | Dillman | 340/52 H |
| 3,665,384 | 5/1972 | Ives | 340/52 F |
| 3,745,523 | 7/1973 | Lewis | 340/52 R |
| 3,774,151 | 11/1973 | Lewis | 340/61 |
| 4,016,426 | 4/1977 | Nishioka | 307/10 R |

Primary Examiner—Alvin H. Waring
Attorney, Agent, or Firm—Peter Abolins; Clifford L. Sadler

[57] ABSTRACT

A diagnostic means is connected to various electrical locations in an air bag system to detect and process faults. When a fault is detected, it is assigned a unique code sequence consisting of equally spaced pulses of equal length. The number of pulses determines the fault which is indicated by a single light inside the car.

6 Claims, 3 Drawing Figures

CODED FAILURE INDICATOR FOR AN AIR BAG SYSTEM

BACKGROUND OF THE INVENTION (1) Field of the Invention

This invention relates to a fault detecting system for an automotive air bag system.

(2) Prior Art

Various fault detecting systems have known shortcomings. For example, a system can have a plurality of fault detecting transducers each producing its own output in the event of a fault and one display unit can be associated with each fault detecting transducer. Such a system has an undesirable repetition of display units as well as an undesirable complexity in display unit connection. In other fault detecting systems, a plurality of fault detectors are connected to a single lamp. Thus, when a malfunction occurs the lamp is illuminated. Although, such a system indicates the occurrence of a malfunction, the system does not distinguish among the various different malfunctions. It would be beneficial to have an indication which of the plurality of malfunctions has occurred. These are some of the drawbacks this invention overcomes.

SUMMARY OF THE INVENTION

This invention teaches an air bag system for an automobile which includes a deceleration sensor means for sensing deceleration of the automobile, an air bag means for providing occupant restraint, air bag firing means coupled to the air bag means for deploying the air bag means, a diagnostic means coupled to the deceleration sensor and the air bag firing means, and an indicating means coupled to the diagnostic means. The diagnostic means actuates the air bag firing means in response to signals from the deceleration sensor. The diagnostic means is coupled to a plurality of different electrical locations in the air bag system to monitor voltage levels at those electrical locations thereby detecting the occurrence of faults at those electrical locations. The indicating means can be a light, which displays a unique signal for any of the plurality of faults. For example, in accordance with one embodiment of this invention, the signals can be a sequence of pulses of equal length, which are equally spaced from one another.

DETAILED DESCRIPTION OF THE INVENTION

Figure 1A:
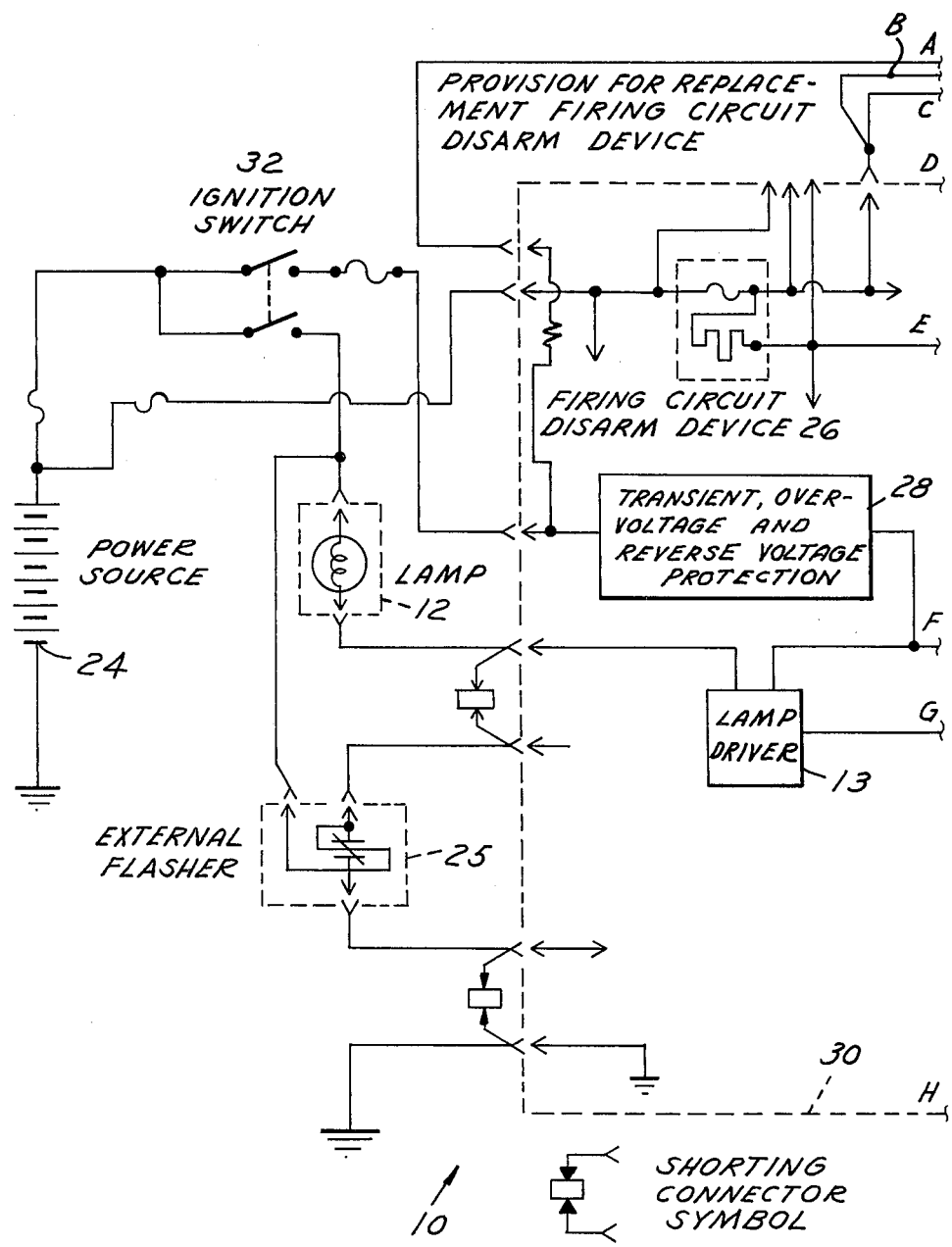
FIGS. 1A and 1B is a schematic drawing of an air bag system including an indicator lamp, a diagnostic monitoring system, and deceleration sensors in accordance with an embodiment of this invention.
Figure 1B:
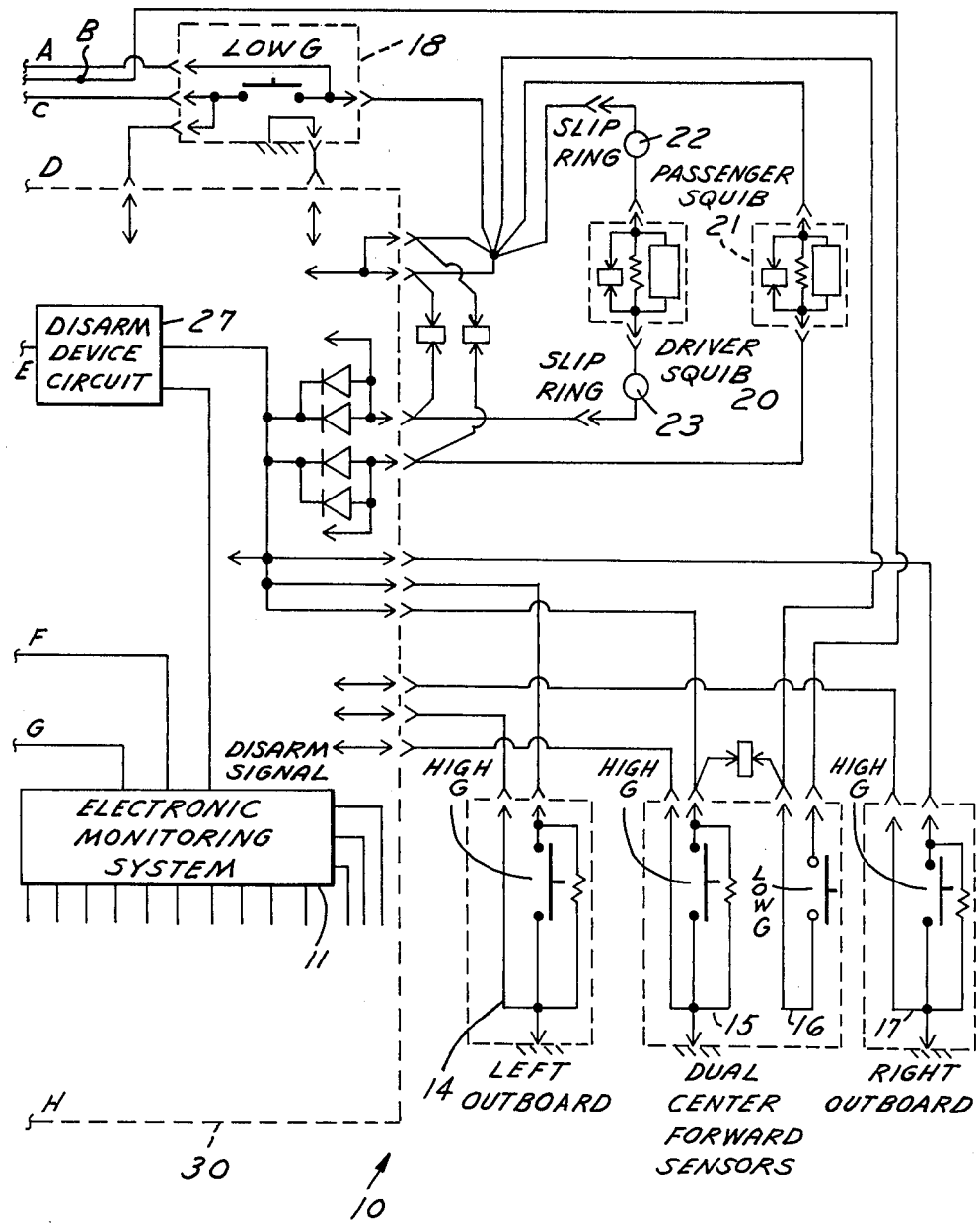

Referring to FIGS. 1A and 1B, a vehicle air bag system 10 utilizes two air bags, one in the steering wheel hub coupled to a driver side igniter or squib 20, and one in the instrument panel, in front of the passengers, coupled to a passenger side squib 21. Impact sensing is accomplished through the use of high-level forward mounted crash sensing elements 14, 15 and 17 and two low-level sensing elements 16 and 18, which are responsive to lower acceleration forces than the high-level sensors. Air bag system 10 further includes a diagnostic module 30, a battery 24, an indicator warning lamp 12, and an external flasher 25. Diagnostic module 30 includes a central electronic monitoring system 11, a lamp driver system 13, a disarm device 26, a disarm device circuit 27 coupling disarm device 26 to monitoring system 11, and a voltage protection circuit 28.

Air bag system 10 performs the following three functions: detecting a crash, switching electric power to air bag squibs and monitoring the system to determine readiness. To achieve the monitoring function, a small diagnostic current is passed through an ignition switch 32 and squibs 20 and 21 to allow detection of an open air bag deployment circuit between the output of diagnostic module 30 through the squibs and the crash sensor ground. When a diagnostic module detects an unacceptable voltage change and determines where this change has taken place, diagnostic module 30 generates a fault code to be displayed by indicator lamp 12.

More particularly, squibs 20 and 21 are electrical igniting devices that initiate the inflater deployment process for both the driver and passenger air bags. To perform this function, the squibs convert an electrical input to thermal energy, provide sufficient ballistics to ignite a booster charge, and attenuate extraneous signals coming from sources such as radio and television transmitters. Slip ring assemblies 22 and 23 are coupled to each side of driver squib 20 and transfer air bag electrical signals from the steering column to the steering wheel.

The high-level crash sensing elements in the forward mounted crash sensor assemblies (left, 14, center, 15, and right, 17) supply an early response to severe head-on or off center impacts. All three forward mounted sensor assemblies are located in the engine compartment. The high-level sensing elements are all connected in parallel on the low voltage or ground side of the squib circuit. As a result, any one of the high-level crash sensing elements can provide a ground path for the deployment circuit. Low-level sensing elements (center forward, 16 and rearward, 18) are connected in parallel on the high voltage side of the squib circuit; either one of the low-level sensing elements can provide a high voltage path for the deployment circuit. As a result, there are sensors on both the ground side and the high voltage side of the squib.

All three forward high level crash sensor assemblies are locally grounded to the vehicle. The high-level sensing elements 14, 15 and 17 employ this ground connection to complete the deployment circuit on the low side of the squibs. As a result, a loose forward sensor assembly is capable of disarming itself. The rearward sensor assembly is also locally grounded to the vehicle. Attachment of all four of the sensor assemblies is monitored through a circuit routed from each sensor assembly to diagnostic module 30. If the vehicle ground connection of anyone of the four sensor becomes open circuited, indicator lamp 12 is flashed continuously by the lamp driver 13 under the control of electronic monitoring system 11.

Whenever the air bag diagnostic module is disconnected from the wiring assembly, external flasher 25 causes the indicator lamp 12 to flash continuously. Shorting terminals in the diagnostic module connector are used to accomplish this feature.

Firing disarm device 26 protects against inadvertent deployment due to shorts to ground in the high-level crash sensor deployment circuits. If shorts occur for approximately more than fifteen seconds, the deployment circuit is permanently opened and the warning lamp caused to flash until the fault is corrected. Firing disarm device 26 is typically a fuse which is opened by a heating current applied by disarm device circuit 27. Advantageously, diagnostic module 30 permits replacement of disarm device 26 without having to remove diagnostic module 30 from the vehicle.

The power source for the air bag diagnostic circuit is applied only when the ignition key is in the run mode. Power for the air bag deployment circuit is derived from a direct battery connection. The deployment circuit will be protected by a fusible link in the engine compartment.

External flasher 25 is connected in series with indicator lamp 12 and activates lamp 12 on and off when the connector for diagnostic module 30 is disengaged from air bag system 10. Shorting contact terminals are used to complete the current path to ground when the connector becomes disengaged with the connector normally engaged by the diagnostic module 30, the shorting contact terminals are open circuited with respect to each other.

The coded fault indications driving indicator lamp 12 are as follows:

| Fault Monitored | Fault Code (No. of Flashes) | Priority |
|---|---|---|
| Disconnected Diagnostic Module Connector | 1 | 1 |
| Diagnostic Module Fault | continuous light | 2 |
| Loss of Air Bag Deployment circuit power (+12 volts) to Diagnostic Module | 3 | 3 |
| Shorted left, center (high level) or right forward crash sensor deployment circuit | 5 | 4 |
| Defective firing circuit disarm device | 10 | 5 |
| Defective rearward sensor (Attachment, Sensing Element, or input/output circuit) | 4 | 6 |
| Driver air bag circuit inoperative | 6 | 7 |
| Passenger air bag circuit Inoperative | 7 | 8 |
| Open left, center, or right forward crash sensor ground circuit | 8 | 9 |
| Open left, center (high level) or right forward crash sensor deployment circuit | 9 | 10 |
| Open external flasher circuit | 11 | 11 |
| All forward crash sensor disconnected | 2 | 12 |

Faults are ranked by priority in the order listed such that if two or more faults exist, only the fault code highest in the list is flashed.

Figure 2:
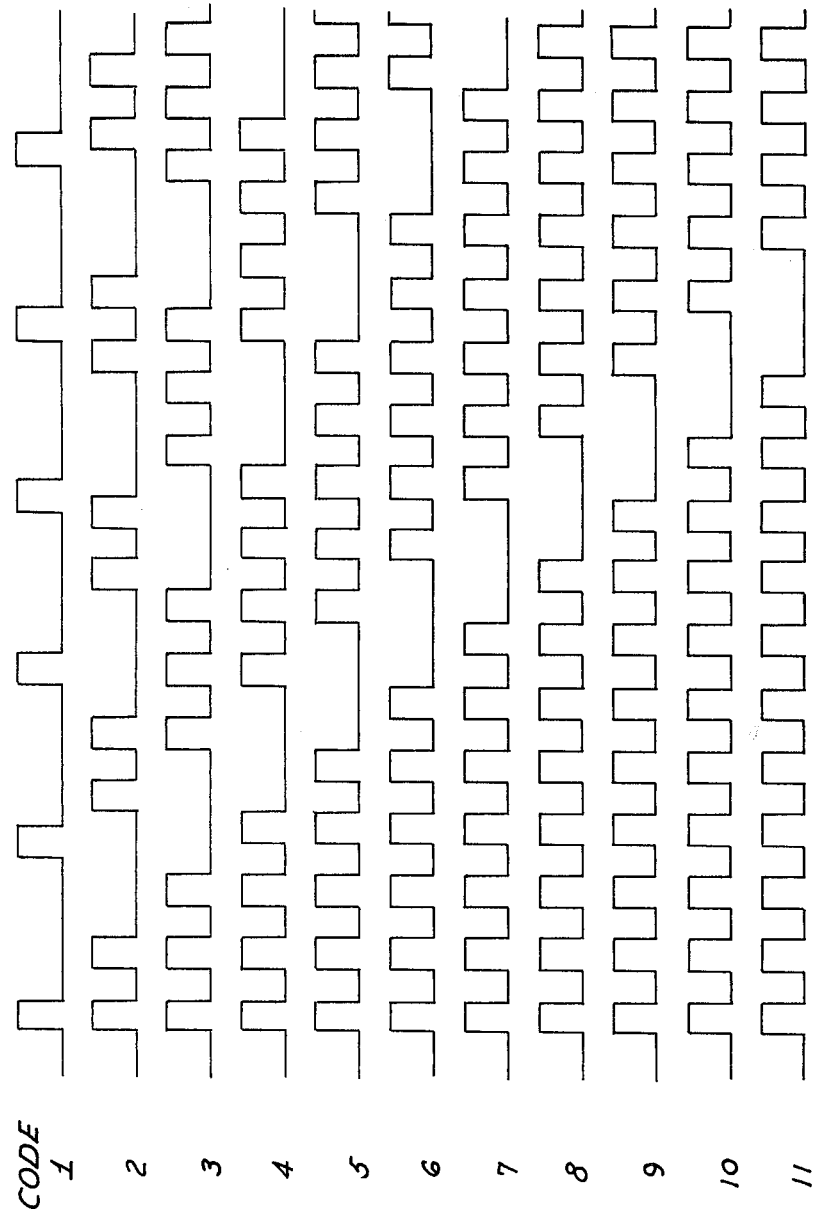
FIG. 2 is a graphical representation of unique fault codes associated with different faults in the air bag system to be displayed by the indicator light in accordance with an embodiment of this invention.

Referring to FIG. 2, the coding is accomplished by a train of pulses which can readily be counted by an operator. It has been found that by using a pulse code of equal width and space, more reliable indication can be made of a specific fault. For example, an operator can more easily count the sequence of flashes than determine how many long flashes and how many short flashes are displayed. An advantageous pulse width is about 0.5 seconds, pulse spacing is about 0.5 seconds, and pulse train spacing is about 2 seconds.

The coded fault indication is also useful during vehicle assembly because the occurrence of a very low priority fault indicates that there exists no higher priority fault. Advantageously, when a worker on the production line sees two flashes he knows that the only fault present arises from all of the forward crash sensor assemblies being disconnected. The existence of any other fault will have a higher priority.

Various modifications and variations will no doubt occur to those skilled in the various arts to which this invention pertains. For example, the particular ordering of the faults monitored may be varied from that disclosed herein. These and all other variations which basically rely on the teachings through which this disclosure has advanced the art are properly considered within the scope of this invention.

We claim:

1. An air bag system for an automobile comprising:
    deceleration sensor means for sensing deceleration of the automobile;
    air bag means for providing occupant restraint;
    air bag firing means coupled to said air bag means for deploying said air bag means;
    diagnostic means coupled to said deceleration sensor means and said air bag firing means for actuating said air bag firing means in response to signals from said deceleration sensor means;
    said diagnostic means being coupled to a plurality of different electrical locations in said air bag system to monitor voltage levels at those electrical locations thereby detecting the occurrence of faults at those electrical locations;
    indicating means coupled to said diagnostic means for giving a unique coded indication of any of a plurality of faults; and wherein
    said diagnostic means associates a unique sequence of equally spaced pulses of an equal duration with a given fault so that a single indicating means can display a plurality of faults by displaying sequences of different length, each sequence including equally spaced pulses of equal duration.

2. An air bag system as recited in claim 1 wherein all of the faults are prioritized and only the fault with the highest priority is displayed.

3. An air bag system as recited in claim 2 wherein said diagnostic means includes the following assignment of priority and uniquely associated pulse sequence:

| Fault Monitored | Fault Code (No. of Flashes) | Priority |
|---|---|---|
| Disconnected Diagnostic Module Connector | 1 | 1 |
| Diagnostic Module Fault | continuous light | 2 |
| Loss of Air Bag Deployment circuit power (+12 volts) to Diagnostic Module | 3 | 3 |
| Shorted left, center (high level) or right forward crash sensor deployment circuit | 5 | 4 |
| Defective firing circuit disarm device | 10 | 5 |
| Defective rearward sensor (Attachment, Sensing Element, or input/output circuit) | 4 | 6 |
| Driver air bag circuit inoperative | 6 | 7 |
| Passenger air bag circuit Inoperative | 7 | 8 |
| Open left, center, or right forward crash sensor ground circuit | 8 | 9 |
| Open left, center (high level) or right forward crash sensor deployment circuit | 9 | 10 |

-continued

| Fault Monitored | Fault Code (No. of Flashes) | Priority |
|---|---|---|
| Open external flasher circuit | 11 | 11 |
| All forward crash sensor disconnected | 2 | 12 |

4. An air bag system as recited in claim 3 wherein said pulse has a duration of about 0.5 seconds and is spaced from an adjacent pulse by about 0.5 seconds.

5. An air bag system as recited in claim 4 wherein a pulse sequence is separated from a sequential pulse sequence by about 2 seconds.

6. An air bag system as recited in claim 5 wherein:
   said indication means is a light capable of flashing and positioned so as to be visible by a driver of the automobile.

* * * * *